United States Patent
Schuster et al.

[19]

[11] Patent Number: 6,041,299
[45] Date of Patent: Mar. 21, 2000

[54] APPARATUS FOR CALCULATING A POSTERIOR PROBABILITY OF PHONEME SYMBOL, AND SPEECH RECOGNITION APPARATUS

[75] Inventors: Mike Schuster, Kyoto; Toshiaki Fukada, Nara, both of Japan

[73] Assignee: ATR Interpreting Telecommunications Research Laboratories, Kyoto, Japan

[21] Appl. No.: 09/038,128

[22] Filed: Mar. 11, 1998

[30] Foreign Application Priority Data

Mar. 11, 1997 [JP] Japan ................................ 9-056138

[51] Int. Cl.$^7$ .................................................. G10L 5/06
[52] U.S. Cl. .......................... 704/232; 706/25; 706/42
[58] Field of Search ....................... 704/202, 232, 704/259; 706/30, 31, 41–43, 22, 21, 25

[56] References Cited

U.S. PATENT DOCUMENTS

| | | | |
|---|---|---|---|
| 5,408,424 | 4/1995 | Lo ............................................. | 706/22 |
| 5,748,848 | 5/1998 | Tresp ........................................ | 706/25 |
| 5,956,702 | 9/1999 | Matsuoka et al. ....................... | 706/22 |

OTHER PUBLICATIONS

Abrash, "Mixture Input Transformations for Adaptation of Hybrid Connectionist Speech Recognizers", 5$^{th}$ European Conf. of Speech Commo. and Technology, Rhodes, Greece, pp. 1–4, 1997.

Mike Schuster, et al., "Bidirectional Recurrent Neural Networks" Nov. 1997, IEEE Transactions On Signal Processing, vol. 45, No. 11, pp. 2673–2681.

M. Schuster, "Learning Out of Time Series With an Extended Recurrent Neural Network", Neural Networks for Signal Processing VI, Proceedings of the 1996 IEEE Signal Processing Society Workshop, (Cat. No. 96TH8205) Neural Networks for Signal Processing Society Workshop, Kyoto, Japan, 4–6, pp. 170–179.

A. Robinson, et al. "An Application of Recurrent Nets to Phone Probability Estimation", IEEE Transaction on Neural Networks, vol. 5, No. 2, Mar. 1, 1994, pp. 298–305.

R. Allen, "A Recurrent Neural Network for Word Identification From Phoneme Sequences", Proceedings of the International Conference on Spoken Language Processing, KOBE, Nov. 18–22, 1990, pp. 1037–1040.

J. Bridle, "Alpha–nets: A Recurrent 'Neural' Network Architecture With A Hidden Mark Model Interpretation", Speech Communication, vol. 9, No. 1, Feb. 1, 1990, pp. 83–92.

Anthony J. Robinson, "An Application of Recurrent Nets to Phone Probability Estimation"; IEEE Transactions on Neural Networks; vol. 5, No. 2, Mar. 1994; pp. 298–305.

Herve Bourlard, "Continuous Speech Recognition by Connectionist Statistical Methods"; IEEE Transactions on Neural Networks; vol. 4, No. 6, Nov. 1993; pp. 893–909.

*Primary Examiner*—David D. Knepper

[57] ABSTRACT

There are disclosed an apparatus for calculating a posteriori probabilities of phoneme symbols and a speech recognition apparatus using the apparatus for calculating a posteriori probabilities of phoneme symbols. A feature extracting section extracts speech feature parameters from a speech signal of an uttered speech sentence composed of an inputted character series, and a calculating section calculates a a posteriori probability of a phoneme symbol of the speech signal, by using a bidirectional recurrent neural network. The bidirectional recurrent neural network includes (a) an input layer for receiving the speech feature parameters extracted by the feature extracting means and a plurality of hypothetical phoneme symbol series signals, (b) an intermediate layer of at least one layer having a plurality of units, and (c) an output layer for outputting a a posteriori probability of each phoneme symbol. The input layer includes (a) a first input neuron group having a plurality of units, for receiving a plurality of speech feature parameters and a plurality of phoneme symbol series signals, (b) a forward module, and (c) a backward module.

16 Claims, 6 Drawing Sheets

Fig.1 First Preferred Embodiment

First Preferred Embodiment
Phoneme-Symbol A Posteriori Probability
Calculating Neural Network 11

First Preferred Embodiment
Equivalent Structure of Phoneme - Symbol A Posteriori
Probability Calculating Neural Network 11

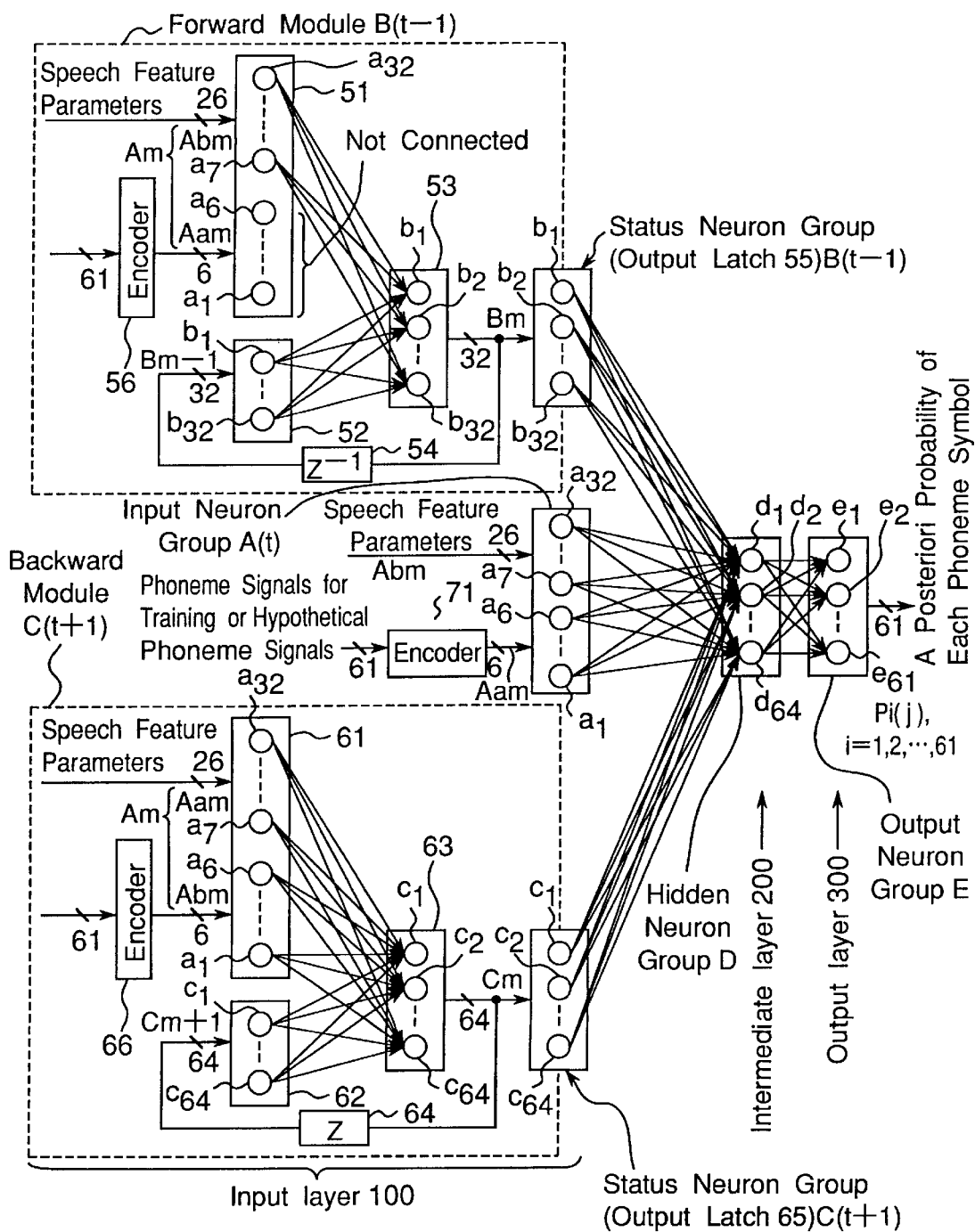

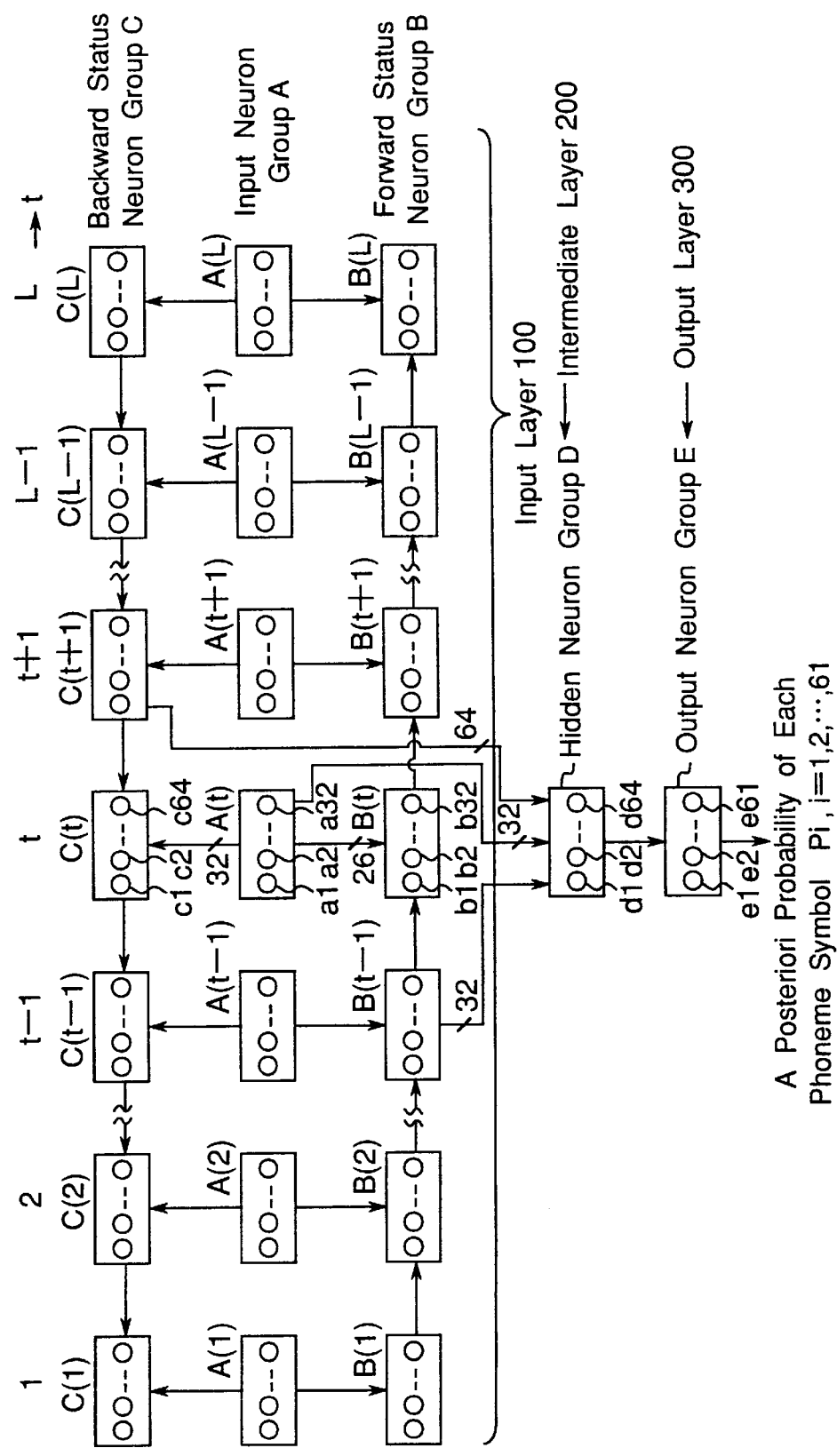

APPARATUS FOR CALCULATING A POSTERIOR PROBABILITY OF PHONEME SYMBOL, AND SPEECH RECOGNITION APPARATUS

BACKGROUND OF THE INVENTION

1. Field of the Invention

The present invention relates to a phoneme-symbol a posteriori probability calculating apparatus and a speech recognition apparatus, and in particular, to a phoneme-symbol a posteriori probability calculating apparatus for calculating a posteriori probabilities of phoneme symbols by using a phoneme-symbol a posteriori probability calculating model based on a speech signal of inputted utterance speech, and a speech recognition apparatus for performing speech recognition by using the phoneme-symbol a posteriori probability calculating model.

2. Description of the Prior Art

Conventionally, methods for calculating estimates of a posteriori probabilities of phoneme symbols necessary for speech recognition by using two results that can be obtained from a multi-layer perceptron (hereinafter, referred to as an MLP) or recurrent neural network (hereinafter, referred to as an RNN) and a hidden Markov model (hereinafter, referred to as an HMM) have been disclosed in, for example, a Prior Art Document 1, H. Bourland, et al., "Continuous Speech Recognition by Connectionist Statistical Methods", IEEE Transactions on Neural Networks, Vol. 4, No. 6, pp. 893–909, November 1993 (hereinafter, referred to as a first prior art), and a Prior Art Document 2, A. J. Robinson, "An Application of Recurrent Nets to Phone Probability Estimation", IEEE Transactions on Neural Network, Vol. 5, No. 2, March 1994 (hereinafter, referred to as a second prior art). In these first and second prior art, when a vector series $x_1, x_2, \ldots, x_L$ of speech feature parameters of one frame is inputted in stead of an acoustic model such as an HMM, a phoneme symbol series which results in a maximum a posteriori probability Pr for such a phoneme symbol series that a phoneme symbol series $c_1, c_2, \ldots, c_L$ can be observed can be expressed as follows:

$$\operatorname*{argmax}_c P(C \mid X) = \operatorname*{argmax}_c P(c_1 c_2 \cdots c_L \mid x_1 x_2 \cdots x_L) \quad (1)$$

$$= \operatorname*{argmax}_c P(x_1 x_2 \cdots x_L \mid c_1 c_2 \cdots c_L) \cdot \frac{P(c_1 c_2 \cdots c_L)}{P(x_1 x_2 \cdots x_L)}$$

$$= \operatorname*{argmax}_c P(x_1 x_2 \cdots x_L \mid c_1 c_2 \cdots c_L) \cdot P(c_1 c_2 \cdots c_L).$$

In this case, a reference character C denotes a set of all the phoneme symbols, and a function "argmax" is a phoneme symbol series which results in a maximum value of the argument over all the phoneme symbols included in the set C of all the phoneme symbols, where X is a matrix of speech feature parameters of one frame which comprises a vector series $x_1, x_2, \ldots, x_L$ of speech feature parameters of one frame. Approximating the Equation (1) under such a condition that the independence among the frames is assumed yields the following equation:

$$\operatorname*{argmax}_c P(C \mid X) \approx = \operatorname*{argmax}_c \left[ \prod_{t=1}^{L} P(x_t \mid c_t) \right] \cdot \left[ \prod_{t=1}^{L} P(c_t \mid c_{t-1}) \right] \quad (2)$$

$$= \operatorname*{argmax}_c \left[ \prod_{t=1}^{L} \frac{P(c_t \mid x_t) \cdot P(x_t)}{P(c_t)} \right] \cdot \left[ \prod_{t=1}^{L} P(c_t \mid c_{t-1}) \right]$$

$$= \operatorname*{argmax}_c \left[ \prod_{t=1}^{L} \frac{P(c_t \mid x_t)}{P(c_t)} \right] \cdot \left[ \prod_{t=1}^{L} P(c_t \mid c_{t-1}) \right]$$

$$= \operatorname*{argmax}_c (Pr_1 \cdot Pr_2).$$

In the first prior art, the first term $Pr_1$ of the argument of the function argmax in the final expression of the Equation (2) is modeled by MLP and the second term $Pr_2$ is modeled by HMM, so that a phoneme symbol series which results in a maximum a posteriori probability Pr of phoneme symbol series can be determined by using the MLP model and the HMM model. In the second prior art, on the other hand, the first term $Pr_1$ of the argument of the function argmax in the final expression of the Equation (2) is modeled by RNN and the second term $Pr_2$ is modeled by HMM, so that a phoneme symbol series which results in a maximum a posteriori probability Pr of phoneme symbol series can be determined by using the MLP model and the HMM model.

However, the first and second prior art, because of their using HMMs for modeling, there are such problems that the apparatuses thereof are so complex in constitution and it is extremely difficult to implement an apparatus for calculating the same a posteriori probability into an integrated circuit (hereinafter, referred to as an IC).

SUMMARY OF THE INVENTION

An essential object of the present invention is to provide an apparatus for calculating a posteriori probabilities of phoneme symbols, which is simple in circuitry and is easy to be integrated into an IC, as compared with the prior art, and moreover which is capable of calculating the a posteriori probability of a phoneme symbol by using a a posteriori probability calculating model for phoneme symbols without any approximation.

Another object of the present invention is to provide a speech recognition apparatus capable of performing speech recognition by using the above-created a posteriori probability calculating model for phoneme symbols.

In order to achieve the above-mentioned objective, according to one aspect of the present invention, there is provided an apparatus for calculating a posteriori probabilities of phoneme symbols, including:

a feature extracting means for extracting speech feature parameters from a speech signal of an uttered speech sentence composed of an inputted character series; and a unit for calculating an posteriori probability of a phoneme symbol of the speech signal, by using a bidirectional recurrent neural network, wherein the bidirectional recurrent neural network includes:

an input layer for receiving, as input signals, the speech feature parameters extracted by the feature extractor and a plurality of hypothetical phoneme symbol series signals;

an intermediate layer of at least one layer having a plurality of units; and an output layer for outputting a a posteriori probability of each phoneme symbol, wherein the input layer includes:

a first input neuron group having a plurality of units, for receiving, as input signals, a plurality of speech feature parameters and a plurality of phoneme symbol series signals;

a forward module; and a backward module, wherein the forward module has a forward-in-time feedback connection, and generates and outputs to the intermediate layer, a plurality of parameters of a timing delayed by a predetermined unit time from a plurality of parameters outputted from said first input neuron group, based on a plurality of speech feature parameters and a plurality of phoneme symbol series signals, and wherein the backward module has a backward-in-time feedback connection, and generates and outputs to the intermediate layer, a plurality of parameters of a timing inversely delayed by a predetermined unit timing from a plurality of parameters outputted from the first input neuron group, based on a plurality of speech feature parameters.

In the above-mentioned apparatus, the forward module includes:

a second input neuron group having a plurality of units, for receiving, as input signals, a plurality of speech feature parameters and a plurality of phoneme symbol series signals;

a first intermediate neuron group having a plurality of units, for receiving, as input signals, a plurality of parameters outputted from a second intermediate neuron group with a delay of a predetermined unit timing; and the second intermediate neuron group having a plurality of units, which is connected to the second input neuron group and the first intermediate neuron group so that a plurality of parameters outputted from the second input neuron group and a plurality of parameters outputted from the first intermediate neuron group are multiplied by respective weighting coefficients and respective multiplied values are respectively inputted to the plurality of units of the second intermediate neutron group.

In the above-mentioned apparatus the backward module includes:

a third input neuron group having a plurality of units, for receiving, as input signals, a plurality of speech feature parameters;

a third intermediate neuron group having a plurality of units, for receiving, as input signals, a plurality of parameters outputted from a fourth intermediate neuron group with an inverse delay of a predetermined unit timing; and the fourth intermediate neuron group having a plurality of units, which is connected to the third input neuron group and the third intermediate neuron group so that a plurality of parameters outputted from the third input neuron group and a plurality of parameters outputted from the third intermediate neuron group are multiplied by respective weighting coefficients and respective multiplied values are respectively inputted to the plurality of units of said fourth intermediate neutron group.

The second intermediate neuron group is connected to the plurality of units of the intermediate layer so that a plurality of parameters outputted from the second intermediate neuron group are multiplied by respective weighting coefficients and respective multiplied values are respectively inputted to the plurality of units of the intermediate layer.

The first input neuron group is connected to the plurality of units of the intermediate layer so that a plurality of parameters outputted from the first input neuron group are multiplied by respective weighting coefficients and respective multiplied values are respectively inputted to the plurality of units of the intermediate layer.

The fourth intermediate neuron group is connected to the plurality of units of the intermediate layer so that a plurality of parameters outputted from the fourth intermediate neuron group are multiplied by respective weighting coefficients and respective multiplied values are respectively inputted to the plurality of units of the intermediate layer.

The intermediate layer is connected to the plurality of units of said output layer so that a plurality of parameters outputted from said intermediate layer are multiplied by respective weighting coefficients and respective multiplied values are respectively inputted to the plurality of units of said output layer.

According to another aspect of the present invention, there is provided an apparatus for calculating a posteriori probabilities of phoneme symbols, including:

a feature extractor means for extracting speech feature parameters from a speech signal of an uttered speech sentence composed of an inputted character series; and a unit for calculating an posteriori probability of a phoneme symbol of the speech signal, by using a bidirectional recurrent neural network, wherein the bidirectional recurrent neural network includes:

an input layer for receiving, as input signals, the speech feature parameters extracted by the feature extracting means and a plurality of hypothetical phoneme symbol series signals;

an intermediate layer of at least one layer, having a plurality of units; and an output layer for outputting a a posteriori probability of each phoneme symbol.

The input layer includes:

a first input neuron group having a plurality of units, for receiving, as input signals, a plurality of speech feature parameters and a plurality of phoneme symbol series signals;

a forward module; and a backward module, wherein the forward module has a forward-in-time feedback connection, and generates and outputs to the intermediate layer, a plurality of parameters of a timing delayed by a predetermined unit timing from a plurality of parameters outputted from the first input neuron group, based on a plurality of speech feature parameters, and wherein the backward module has a backward-in-time feedback connection, and generates and outputs to said intermediate layer, a plurality of parameters of a timing inversely delayed by a predetermined unit timing from a plurality of parameters outputted from the first input neuron group, based on a plurality of speech feature parameters and a plurality of phoneme symbol series signals.

In the above-mentioned apparatus, the forward module includes:

a second input neuron group having a plurality of units, for receiving, as input signals, a plurality of speech feature parameters;

a first intermediate neuron group having a plurality of units, for receiving, as input signals, a plurality of parameters outputted from a second intermediate neuron group with a delay of a predetermined unit timing; and the second intermediate neuron group having a plurality of units, which is connected to said second input neuron group and the first intermediate neuron group so that a plurality of parameters outputted from the second input neuron group and a plurality of parameters outputted from the first intermediate neuron group are multiplied by respective weighting coefficients and respective multiplied values are respectively inputted to the plurality of units of the second intermediate neutron group.

The backward module includes:

a third input neuron group having a plurality of units, for receiving, as input signals, a plurality of speech feature parameters and a plurality of phoneme symbol series signals;

a third intermediate neuron group having a plurality of units, for receiving, as input signals, a plurality of parameters outputted from a fourth intermediate neuron group with an inverse delay of a predetermined unit timing; and the fourth intermediate neuron group having a plurality of units, which is connected to the third input neuron group and the third intermediate neuron group so that a plurality of parameters outputted from the third input neuron group and a plurality of parameters outputted from the third intermediate neuron group are multiplied by respective weighting coefficients and respective multiplied values are respectively inputted to the plurality of units of the fourth intermediate neuron group.

The second intermediate neuron group are connected to the plurality of units of said intermediate layer so that a plurality of parameters outputted from said second intermediate neuron group are multiplied by respective weighting coefficients and respective multiplied values are respectively inputted to the plurality of units of the intermediate layer.

The first input neuron group are connected to the plurality of units of the intermediate layer so that a plurality of parameters outputted from the first input neuron group are multiplied by respective weighting coefficients and respective multiplied values are respectively inputted to the plurality of units of the intermediate layer.

The fourth intermediate neuron group are connected to the plurality of units of the intermediate layer so that a plurality of parameters outputted from the fourth intermediate neuron group are multiplied by respective weighting coefficients and respective multiplied values are respectively inputted to the plurality of units of said intermediate layer.

The intermediate layer are connected to the plurality of units of said output layer so that a plurality of parameters outputted from said intermediate layer are multiplied by respective weighting coefficients and respective multiplied values are respectively inputted to the plurality of units of said output layer.

The above-mentioned apparatus preferably further includes:

an encoding for encoding the plurality of phoneme symbol series signals and outputting the encoded signals to the first, second and third input neuron groups.

According to a further aspect of the present invention, there is provided a speech recognition apparatus including:

a feature extractor for extracting speech feature parameters from a speech signal of an uttered speech sentence composed of an inputted character series;

the above-mentioned unit for calculating a a posteriori probability of a phoneme symbol of the speech signal, by using the above-mentioned bidirectional recurrent neural network; and a speech recognizer means for selecting, as a detected phoneme, a phoneme symbol having the greatest a posteriori probability out of phoneme symbols having a posteriori probabilities calculated by the unit for calculating means, based on the feature parameters extracted by the feature extractor thereby performing speech recognition on the speech signal.

BRIEF DESCRIPTION OF THE DRAWINGS

These and other objects and features of the present invention will become clear from the following description taken in conjunction with the preferred embodiments thereof with reference to the accompanying drawings throughout which like part are designated by like reference numerals, and in which:

FIG. 5 is a block diagram showing a constitution of a phoneme-symbol a posteriori probability calculating neural network 11a, which is a second preferred embodiment according to the present invention; and FIG. 6 is a block diagram showing an equivalent structure of the phoneme-symbol a posteriori probability calculating neural network 11a shown in FIG. 5.

DETAILED DESCRIPTION OF THE PREFERRED EMBODIMENTS

Preferred embodiments according to the present invention will be described below with reference to the attached drawings.

MODELING OF A PHONEME-SYMBOL A POSTERIORI PROBABILITY CALCULATING MODEL

In the present preferred embodiment, when a vector series $x_1, x_2, \ldots, x_L$ of speech feature parameters of one frame is inputted, that is, when a series of a plurality L of vectors resulting from a division into a plurality L of speech segments (having a segment length of, for example, 10 milliseconds) of one frame is inputted, a phoneme symbol series at which the a posteriori probability for such a phoneme symbol series that a phoneme symbol series $c_1, c_2, \ldots, c_L$ can be observed comes to a maximum can be expressed as the following Equations (4) and (5) by using the following Equation (3) on probability:

$$p(x, y) = p(x)p(x|y) \quad (3)$$

$$\operatorname*{argmax}_{c} P(C|X) = \operatorname*{argmax}_{c} P(c_1 c_2 \cdots c_L | x_1 x_2 \cdots x_L) \quad (4)$$

$$= \operatorname*{argmax}_{c} \left[ \prod_{t=1}^{L} P(c_t | c_1 c_2 \cdots c_{t-1}, x_1 x_2 \cdots x_L) \right],$$

and $$\operatorname*{argmax}_{c} P(C|X) = \operatorname*{argmax}_{c} P(c_1 c_2 \cdots c_L | x_1 x_2 \cdots x_L) \quad (5)$$

$$= \operatorname*{argmax}_{c} \left[ \prod_{t=1}^{L} P(c_t | c_{t+1} c_{t+2} \cdots c_L, x_1 x_2 \cdots x_L) \right].$$

In this case, the Equation (4) shows the a posteriori probability of a phoneme symbol derived by a forward a posteriori probability estimation (hereinafter, referred to as MAP forward a posteriori probability estimation) using the maximum a posteriori probability estimation (hereinafter, referred to as a MAP estimation). The probability $P(c_t|c_1 c_2 \ldots c_{t-1}, x_1 x_2 \ldots x_L)$ in the final expression of the Equation (4) represents the a posteriori probability at which the timing t-th phoneme symbol $c_t$ occurs when the vector series $x_1, x_2, \ldots, x_L$ of speech feature parameters of one frame is inputted and when the timing first phoneme symbol $c_1$ to the timing (t−1)-th phoneme symbol $c_{t-1}$ are inputted.

Figure 1:
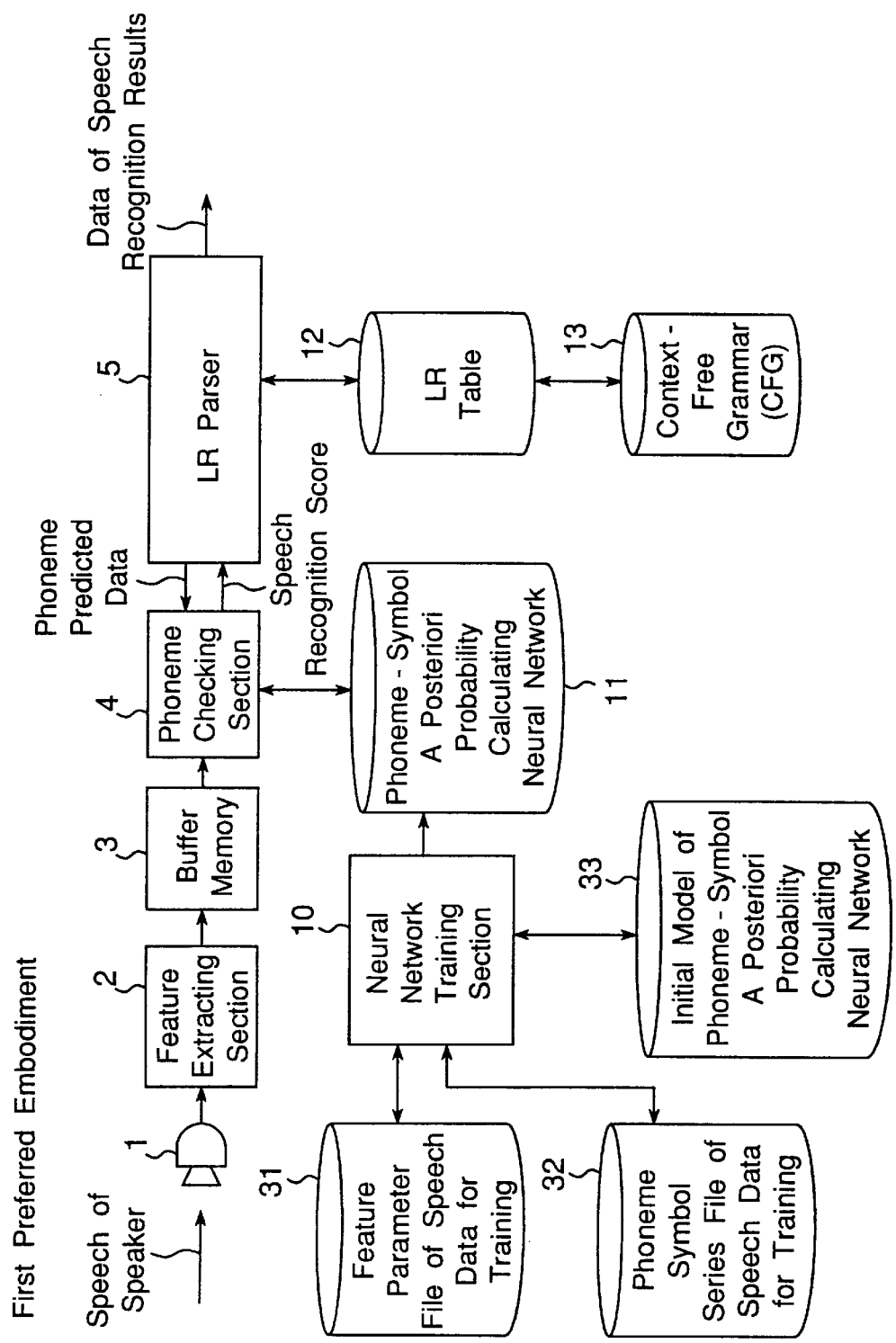
FIG. 1 is a block diagram showing a constitution of a speech recognition apparatus using a phoneme-symbol a posteriori probability calculating neural network, which is a first preferred embodiment according to the present invention.
Figure 2:
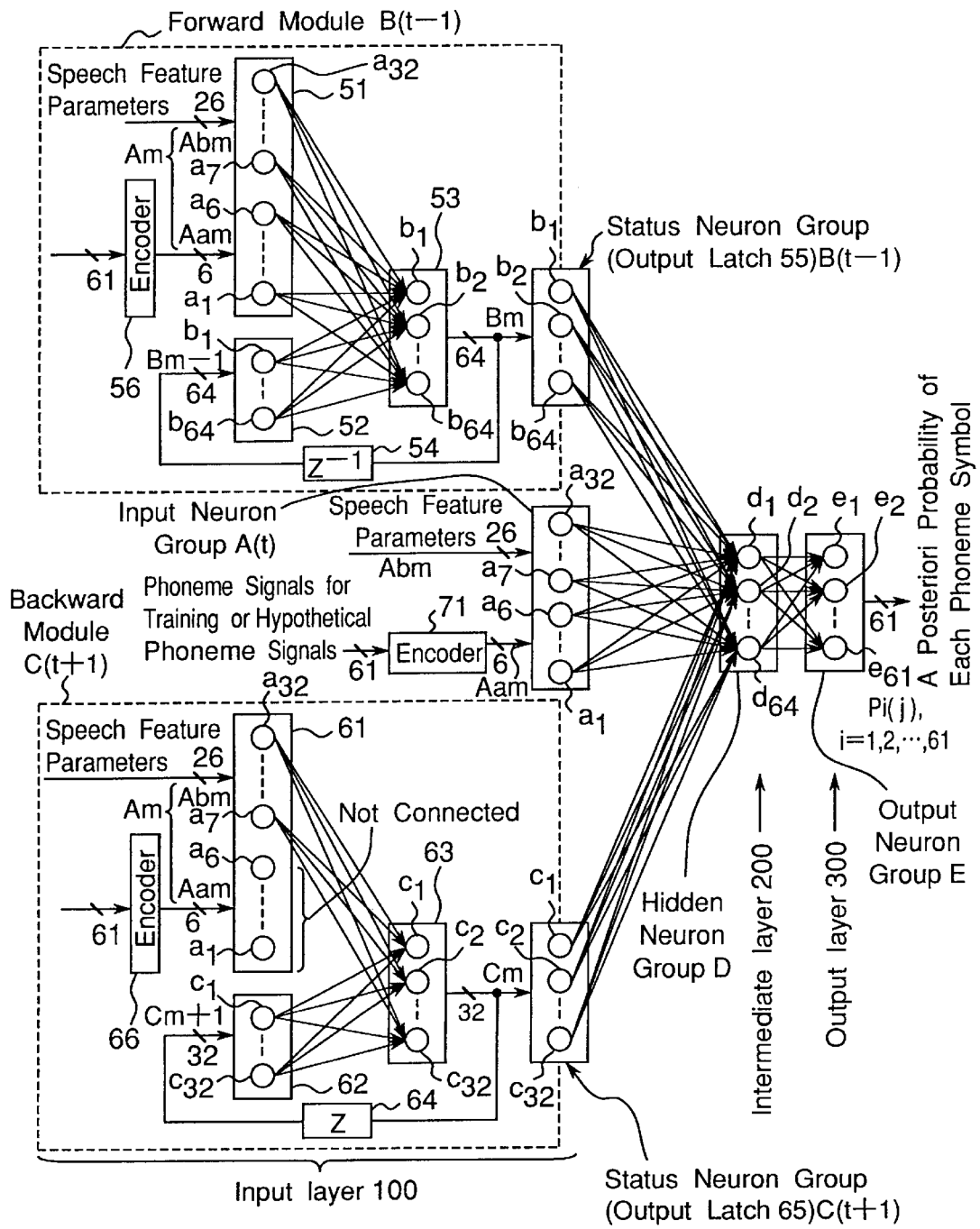
FIG. 2 is a block diagram showing a constitution of a phoneme-symbol a posteriori probability calculating neural network 11 shown in FIG. 1.

In the first preferred embodiment, the probability $P(c_t|c_1 c_2 \ldots c_{t-1}, x_1 x_2 \ldots x_L)$ is calculated by using the phoneme-symbol a posteriori probability calculating neural network 11 of FIGS. 1 and 2. This phoneme-symbol a posteriori probability calculating neural network 11 is trained to be created in advance by a neural network training section 10, based on 26-dimensional speech feature parameters stored in a parameter file 31 of speech data for training, and phoneme signals for training stored in a phoneme symbol series file 32 of speech data for training.

It is noted that the phoneme signal herein refers to a phoneme symbol series signal. Also, the 26-dimensional speech feature parameters preferably include 12-dimensional mel frequency cepstrum coefficients or mel-cepstrum coefficients (hereinafter, referred to as MFCCs), a log power, and respective primary recurrent coefficients of the MFCCs and the log power. Further, the output values outputted from the phoneme-symbol a posteriori probability calculating neural network 11 are a posteriori probabilities $P_i$ (i=1, 2, . . . , 61) for 61 phoneme symbols, where the 61 phoneme symbols are, in the present preferred embodiment, phoneme symbols when the utterance language is English, and are as shown in the following Table 1.

TABLE 1 aa, ae, ah, ao, aw, ax, axh, axr, ay, b, bcl, ch, d, dcl,
dh, dx, eh, el, em, en, eng, epi, er, ey, f, g, gcl, sil,
hh, hv, ih, ix, iy, jh, k, kcl, l, m, n, ng, nx, ow, oy,
p, pau, pcl, q, r, s, sh, t, tcl, th, uh, uw, ux, v, w,
y, z, zh Although the phoneme symbols for the utterance language of English are used in the present preferred embodiment, the present invention is not limited to this, and the present invention may use phoneme symbols in the other languages. For example, twenty-six phoneme symbols are involved in the utterance language of Japanese.

In the first preferred embodiment, by using the phoneme-symbol a posteriori probability calculating neural network 11 trained to be created based on speech feature parameters of inputted one frame and hypothetical phoneme signals that hypothetically show which phoneme symbol each segment of the frame corresponds to, a phoneme checking section 4 determines the phoneme symbol of the maximum a posteriori probability argmax P(C|X) of the Equation (4), and detects the type of the phoneme symbol of the inputted one frame. It is to be noted here that, when Ln frames are detected using one file, one phoneme symbol is detected for each frame. That is, it is to be noted that, for example, if the phoneme symbols of an utterance speech are /o/h/a/y/o/, then the output from the phoneme checking section 4 will be /o/o/o/o/h/h/a/a/a/y/y/o/o/o/o.

The Equation (5) shows the a posteriori probability of a phoneme symbol derived by the backward a posteriori probability estimation (hereinafter, referred to as MAP backward a posteriori probability estimation) using the MAP estimation. The probability $P(c_t|c_{t+1} c_{t+2} \ldots c_L, x_1 x_2 \ldots x_L)$ in the final expression of the Equation (5) represents the a posteriori probability at which the timing t-th phoneme symbol $c_t$ occurs when the vector series $x_1, x_2, \ldots, x_L$ of speech feature parameters of one frame is inputted and when the timing (t+1)-th phoneme symbol $c_{t+1}$ to the timing L-th phoneme symbol $c_L$ are inputted. In the second preferred embodiment, the probability $P(c_t|c_{t+1} c_{t+2} \ldots c_L, x_1 x_2 \ldots x_L)$ is calculated by using the phoneme-symbol a posteriori probability calculating neural network 11a shown in FIG. 5. This phoneme-symbol a posteriori probability calculating neural network 11a is trained to be created in advance by the neural network training section 10 based on 26-dimensional speech feature parameters stored in the parameter file 31 of speech data for training, and on phoneme signals for training stored in the phoneme symbol series file 32 of speech data for training.

Then, in the second preferred embodiment, by using the phoneme-symbol a posteriori probability calculating neural network 11a trained to be created based on speech feature parameters of inputted one frame and hypothetical phoneme signals that hypothetically show which phoneme symbol each segment of the frame corresponds to, the phoneme checking section 4 determines the phoneme symbol of the maximum probability argmax P(C|X) of the Equation (5), and detects the type of the phoneme symbol for the inputted one frame.

FIRST PREFERRED EMBODIMENT

FIG. 1 is a block diagram of a speech recognition apparatus using the phoneme-symbol a posteriori probability calculating neural network 11 which is the first preferred embodiment according to the present invention.

FIG. 1, shows the present preferred embodiment.

A neural network training section 10 obtains a phoneme-symbol a posteriori probability calculating neural network 11 by training an initial model 33 of the phoneme-symbol a posteriori probability calculating neural network using the MAP forward estimation. A predetermined training algorithm based on the feature parameter file 31 of speech data for training and the phoneme symbol series file 32 of speech data is used for training, The phoneme checking section 4 calculates the a posteriori probabilities of phoneme symbols by using the obtained phoneme-symbol a posteriori probability calculating neural network 11, and detects the phoneme symbols and thus performs speech recognition.

Accordingly, the neural network training section 10 constitutes an apparatus for creating a phoneme-symbol a posteriori probability calculating neural network. Also, the phoneme checking section 4 constitutes a phoneme-symbol a posteriori probability calculating apparatus for calculating a posteriori probabilities of phoneme symbols by using the phoneme-symbol a posteriori probability calculating neural network 11 based on inputted speech feature parameters.

The present preferred embodiment employs a phoneme-symbol a posteriori probability calculating neural network 11 implemented by a bidirectional recurrent neural network (hereinafter, referred to as a BRNN) as shown in FIG. 2 in order to calculate a posteriori probabilities of phoneme symbols. Whereas the common recurrent neural network reflexively utilizes information of the past in terms of time or timing, the BRNN features in its capability of utilizing input information of the past and future.

Referring to FIG. 2, as input signals to the neural network 11 upon the training process, there are inputted speech feature parameters Abm such as cepstrum coefficients or the like and a 6-bit encoded phoneme signal Aam for training which results from encoding by encoders 56, 66 and 71 a 61-bit phoneme signal for training representing which phoneme symbol out of the 61 phoneme symbols the pertinent frame input corresponds to. Then, upon calculation of the a posteriori probability of a phoneme symbol, there is inputted a 6-bit hypothetical encoded phoneme signal Aam which results from encoding a hypothetical phoneme signal by the encoders 56, 66 and 71, instead of the phoneme signal Aam for training. In this case, the speech feature parameters Abm are normalized to an interval [−1, +1] before being inputted, while the encoded phoneme signal Aam is changed in variables from [0., 1] to the interval [−1, +1] before being inputted.

As to the output signals for the training process, on the other hand, probability information representing which phoneme symbol the current frame input corresponds to (for example, "1" when the frame corresponds to the current phoneme symbol; otherwise, "0") is given as a training signal for the training process. Then, upon the calculation of the a posteriori probability of a phoneme symbol, a calculated a posteriori probability of a phoneme symbol is outputted from the neural network 11.

The outputted a posteriori probabilities $P_i$ of the 61 phoneme symbols are inputted to the phoneme checking section 4, which then, for example, detects the phoneme symbol having the greatest a posteriori probability among them as a phoneme symbol candidate for the current frame. That is, the number of units of a neuron group A(t) is 32 in total, consisting of the number of dimensions of 26 of speech feature parameters and the number of encoded phoneme signals of 6, which is either 6-bit encoded phoneme signals (upon training) or hypothetical encoded phoneme signals (upon calculation of the a posteriori probability of a phoneme symbol). On the other hand, the number of units for outputting is the number of phoneme symbols of 61. In this case, the speech feature parameters include 12-dimensional MFCCs, a log power, and the primary recurrent coefficients of the MFCCs and the log power. Hereinafter, the total number of frames of one file is assumed as a plurality L in each case.

In the present preferred embodiment, the number of bits is reduced by encoding phoneme signals. However, the present invention is not limited to this, and the phoneme signals may be inputted to the neural network 11 as they are without being encoded.

Referring to FIG. 2, a forward module B(t−1) is a module which has a forward-in-time feedback connection by a delay element 54, and which generates and outputs to a hidden neuron group D, 64 parameters of timing "t−1" delayed by a predetermined unit timing or time from 32 parameters which are outputted from the input neuron group A(t), based on the 26 speech feature parameters and 6 encoded phoneme signals. The forward module B(t−1) comprises:

(a) an input neuron group 51 having 32 units $a_1$ to $a_{32}$ which receive, as input signals, 26 speech feature parameters Abm and 6 encoded phoneme signals Aam;

(b) an intermediate neuron group 52 having 64 units $b_1$ to $b_{64}$ which receive, as input signals, 64 parameters outputted from an intermediate neuron group 53 via the delay element 54;

(c) the intermediate neuron group 53 having 64 units $b_1$ to $b_{64}$ which are connected in such a way that 32 parameters outputted from the input neuron group 51 and 64 parameters outputted from the intermediate neuron group 52 are multiplied by respective weighting coefficients and the respective multiplied values are respectively inputted to respective units $b_1$ to $b_{64}$ of the intermediate neuron group 53;

(d) the delay element 54 which outputs 64 parameters outputted from the intermediate neuron group 53, to the intermediate neuron group 52 with a delay of a predetermined unit timing or time; and (e) an output latch 55 which is a status neuron group of the forward module B(t−1) having 64 units $b_1$ to $b_{64}$ and which temporarily stores or latches, the output values outputted from the intermediate neuron group 53 at the timing "t−1" upon completion of the operation of the forward module B(t−1), and outputs them to the hidden neuron group D of a right-side neural network for the calculation of a posteriori probabilities of phoneme symbols.

In the forward module B(t−1) constructed as described above, a feedback loop is formed from the intermediate neuron group 52 via the intermediate neuron group 53 and the delay element 54 to the intermediate neuron group 52. The output parameter vectors $B_m$ (m=1, 2, . . . , t−1) outputted from the intermediate neuron group 52 at the timing "t−1" upon completion of the operation of the forward module B(t−1) after iterated calculations can be expressed by the following equation:

$$B_m = W_{FA} \cdot A_m + W_{FB} \cdot B_{m-i} \qquad (6).$$

In this case, the output value vectors $B_m$ are comprised of 64 parameter values, and their initial value vector $B_0$ can be expressed by the following equation:

$$B_0 = \begin{bmatrix} 0 \\ 0 \\ \cdots \\ \cdots \\ 0 \end{bmatrix}. \quad (7)$$

Also, input parameter vectors $A_m$ for the input neuron group 51 can be expressed by the following equation:

$$A_m = \begin{bmatrix} Aam \\ Abm \end{bmatrix} = \begin{bmatrix} H(1) \\ \cdots \\ H(6) \\ O_m(1) \\ \cdots \\ O_m(26) \end{bmatrix}, \quad (8)$$

where H (1) through H (6) at timing "m" are the encoded phoneme signals, $O_m(1)$ is the first-order value of MFCCs at the timing "m", $O_m(2)$ is the second-order value of MFCCs at the timing "m", and likewise for the following, $O_m(26)$ is the 26th-order value of MFCCs at the timing "m".

Further, weighting coefficients matrices $W_{FA}$ and $W_{FB}$ in the Equation (1) are a 64×32 matrix and a 64×64 matrix, respectively, and can be expressed by the following equations:

$$W_{FA} = \begin{bmatrix} W_{FA1,1} & W_{FA1,2} & \cdots & W_{FA1,32} \\ W_{FA2,1} & W_{FA2,2} & \cdots & W_{FA2,32} \\ \cdots & \cdots & \cdots & \cdots \\ \cdots & \cdots & \cdots & \cdots \\ W_{FA64,1} & W_{FA64,2} & \cdots & W_{FA64,32} \end{bmatrix}, \text{ and} \quad (9)$$

$$W_{FB} = \begin{bmatrix} W_{FB1,1} & W_{FB1,2} & \cdots & W_{FB1,64} \\ W_{FB2,1} & W_{FB2,2} & \cdots & W_{FB2,64} \\ \cdots & \cdots & \cdots & \cdots \\ \cdots & \cdots & \cdots & \cdots \\ W_{FB64,1} & W_{FB64,2} & \cdots & W_{FB64,64} \end{bmatrix}. \quad (10)$$

Further, referring to FIG. 2, a backward module C(t+1) is a module which has a backward-in-time feedback connection by an inverse delay element 64, and which generates and outputs to the hidden neuron group D, 32 parameters of timing "t−1" inversely delayed by a predetermined unit timing or time from 32 parameters which are outputted from the input neuron group A(t), based on the 26 speech feature parameters and 6 encoded phoneme signals. The backward module C(t+1) comprises:

(a) an input neuron group 61 having 32 units $a_1$ to $a_{32}$ which receive, as input signals, 26 speech feature parameters Abm and 6 encoded phoneme signals Aam;

(b) an intermediate neuron group 62 having 32 units $c_1$ to $c_{32}$ which receive, as input signals, 32 parameters that are outputted from an intermediate neuron group 63 via the inverse delay element 64;

(c) the intermediate neuron group 63 having 32 units $c_1$ to $c_{32}$ which are connected in such a way that 26 speech feature parameters Abm out of the 32 parameters outputted from the input neuron group 61 and 32 parameters outputted from the intermediate neuron group 62 are multiplied by respective weighting coefficients and the respective multiplied values are respectively inputted to respective 32 units $c_1$ to $c_{32}$ of the intermediate neuron group 63;

(d) the inverse delay element 64 which outputs 32 parameters outputted from the intermediate neuron group 63, to the intermediate neuron group 62 with a delay of a predetermined unit timing or time; and (e) an output latch 65 which is a status neuron group of the backward module C(t+1) having 32 units $c_1$ to $c_{32}$ and which temporarily stores or latches, the output values outputted from the intermediate neuron group 63 at the timing "t+1" upon completion of the operation of the backward module C(t+1), and outputs them to the hidden neuron group D of the right-side neural network for the calculation of a posteriori probabilities of phoneme symbols.

In this case, the backward module C(t+1) is characterized in that the units $a_1$ through $a_6$ of the input neuron group 61 are not connected to the units $c_1$ through $c_{32}$ of the intermediate neuron group 63.

In the backward module C(t+1) constructed as described above, a feedback loop is formed from the intermediate neuron group 62 via the intermediate neuron group 63 and the inverse delay element 64 to the intermediate neuron group 62. The output parameter vectors $C_m$ (m=L, L−1, . . . , t+1) outputted from the intermediate neuron group 63 at the timing "t+1" upon completion of the operation of the backward module C(t+1) after iterated calculations can be expressed by the following equation:

$$C_m = W_{BA} \cdot A_m + W_{BC} \cdot C_{m+1} \quad (11).$$

In this case, the output value vectors $C_m$ are comprised of 32 parameter values, and their initial value vector $C_{L+1}$ can be expressed by the following equation:

$$C_{L+1} = \begin{bmatrix} 0 \\ 0 \\ \cdots \\ \cdots \\ 0 \end{bmatrix}. \quad (12)$$

Also, input parameter vectors $A_m$ for the input neuron group 61 are the same as those in the Equation (3).

Further, weighting coefficient matrices $W_{BA}$ and $W_{BC}$ in the Equation (6) are a 32×32 matrix and a 32×32 matrix, respectively, and can be expressed by the following equations:

$$W_{BA} = \begin{bmatrix} 0 & \cdots & 0 & W_{BA1,7} & \cdots & W_{BA1,32} \\ \cdots & \cdots & \cdots & \cdots & \cdots & \cdots \\ 0 & \cdots & 0 & W_{BA6,7} & \cdots & W_{BA6,32} \\ 0 & \cdots & 0 & W_{BA7,7} & \cdots & W_{BA7,32} \\ \cdots & \cdots & \cdots & \cdots & \cdots & \cdots \\ 0 & \cdots & 0 & W_{BA32,7} & \cdots & W_{BA32,32} \end{bmatrix}, \text{ and} \quad (13)$$

$$W_{BC} = \begin{bmatrix} W_{BC1,1} & W_{BC1,2} & \ldots & W_{BC1,32} \\ W_{BC2,1} & W_{BC2,2} & \ldots & W_{BC2,32} \\ \ldots & \ldots & \ldots & \ldots \\ \ldots & \ldots & \ldots & \ldots \\ W_{BC32,1} & W_{BC32,2} & \ldots & W_{BC32,32} \end{bmatrix}. \quad (14)$$

As shown in FIG. 2, the a posteriori-probability calculating neural network 11 further comprises the hidden neuron group D having 64 hidden units $d_1$ to $d_{64}$, and an output neuron group E which have 61 output units $e_1$ to $e_{61}$ and which outputs a posteriori probabilities $P_i$ (i=1, 2, ..., 61) of 61 phoneme symbols.

The units $b_1$ to $b_{64}$ of the status neuron group B(t−1) are respectively connected to the units $d_1$ to $d_{64}$ of the hidden neuron group D so that output parameters from the units $b_1$ to $b_{64}$ of the status neuron group B(t−1) are multiplied by respective weighting coefficients and respective multiplied result values are respectively inputted to the units $d_1$ to $d_{64}$ of the hidden neuron group D. The units $c_1$ to $c_{32}$ of the status neuron group C(t+1) are respectively connected to the units $d_1$ to $d_{64}$ of the hidden neuron group D so that output parameters from the units $c_1$ to $c_{32}$ of the status neuron group C(t+1) are multiplied by respective weighting coefficients and the respective multiplied values are respectively inputted to the units $d_1$ to $d_{64}$ of the hidden neuron group D. The 32 units $a_1$ to $a_{32}$ of the input neuron group A(t) are respectively connected to the units $d_1$ to $d_{64}$ of the hidden neuron group D so that output parameters from the 32 units $a_1$ to $a_{32}$ of the input neuron group A(t) are multiplied by respective weighting coefficients and the respective multiplied values are respectively inputted to the units $d_1$ to $d_{64}$ of the hidden neuron group D.

Furthermore, the output neuron group E is connected to the hidden neuron group D so that the output parameters from the units $d_1$ to $d_{64}$ of the hidden neuron group D are multiplied by respective weighting coefficients and the respective multiplied values are respectively inputted to the output units $e_1$ to $e_{61}$ of the output neuron group E.

In this case, for the processing ranging from the status neuron groups B(t−1) and C(t+1) as well as the input neuron group A(t) to the hidden neuron group D up to the output neuron group E, the training or calculating process is executed after the completion of the processing operation of the forward module B(t−1) and the backward module C(t+1).

In this neural network 11, an input layer 100 comprises the input neuron group A(t), the forward module B(t−1) for calculating output parameters at timing "t−1" delayed by a unit timing or time from the output timing "t" of the input neuron group A(t), and the backward module C(t+1) for calculating output parameters at timing "t+1" inversely delayed by a unit timing or time from the timing "t". An intermediate layer 200 comprises the hidden neuron group D, and an output layer 300 comprises the output neuron group E.

Figure 3:
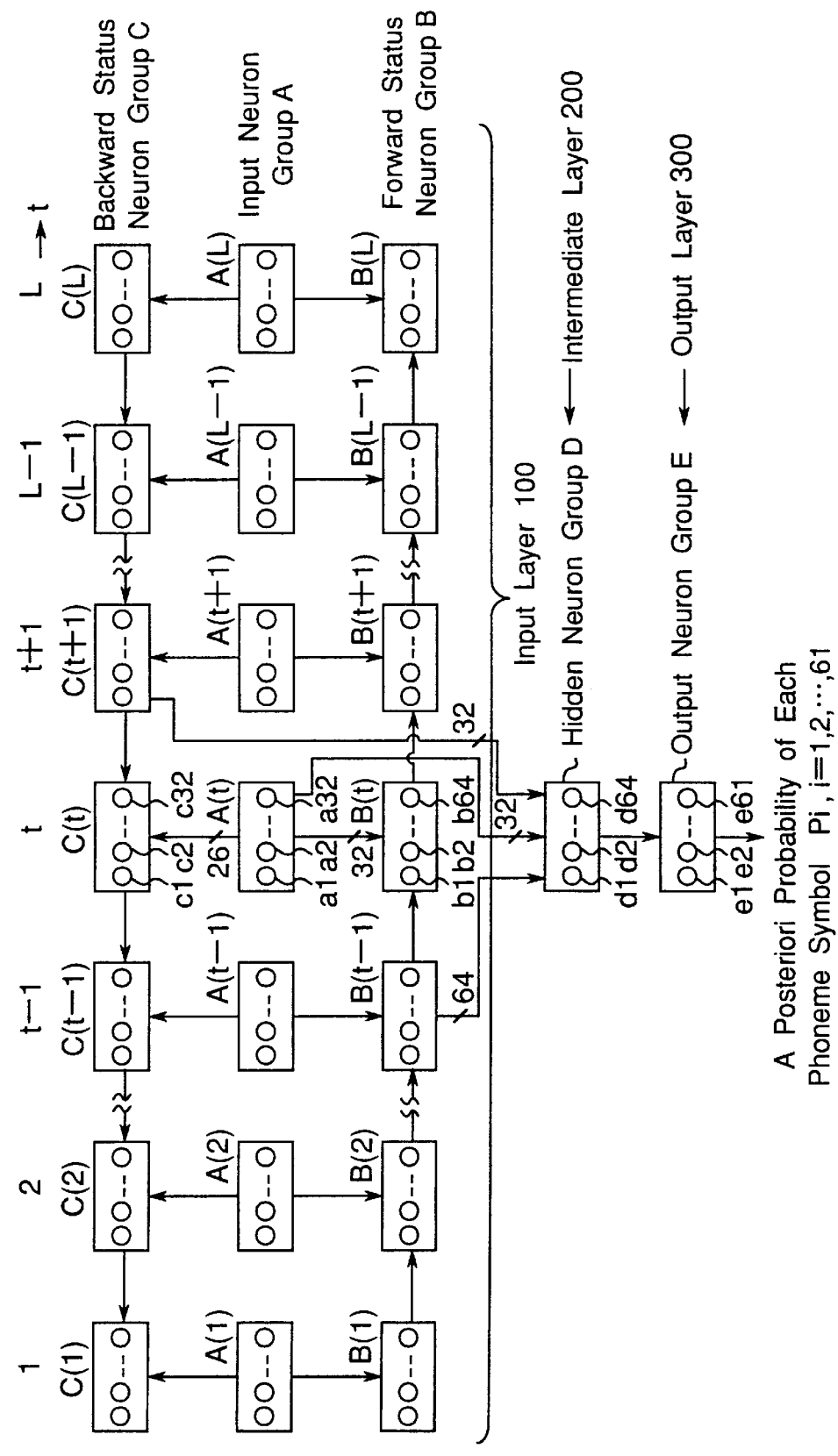
FIG. 3 is a block diagram showing an equivalent structure of the phoneme-symbol a posteriori probability calculating neural network 11 shown in FIG. 2.

The phoneme-symbol a posteriori probability calculating neural network 11 constructed as described above is equivalently as shown in FIG. 3, and is a BRNN, in which the forward module comprising the units of the forward status neutron group B and the backward module comprising the units of the backward status neutron group C are connected in the direction of time respectively, and the input layer 100 comprises the input neuron group A(t), the forward module B(t−1) and the backward module C(t+1).

In addition, referring to FIG. 1, an A/D converter 1, a feature extracting section 2, the phoneme checking section 4, an LR parser 5 and the neural network training section 10 are constituted by, for example, an arithmetic and control unit or a controller such as a digital computer. A buffer memory 3 is constituted by, for example, a hard disk memory. The feature parameter file 31 of speech data for training, the phoneme symbol series file 32 of speech data for training, the initial model 33 of the phoneme-symbol a posteriori probability calculating neural network, the phoneme-symbol a posteriori probability calculating neural network 11, an LR table 12 and a context-free grammar database 13 are stored in, for example, hard disk memories, respectively.

Figure 4:
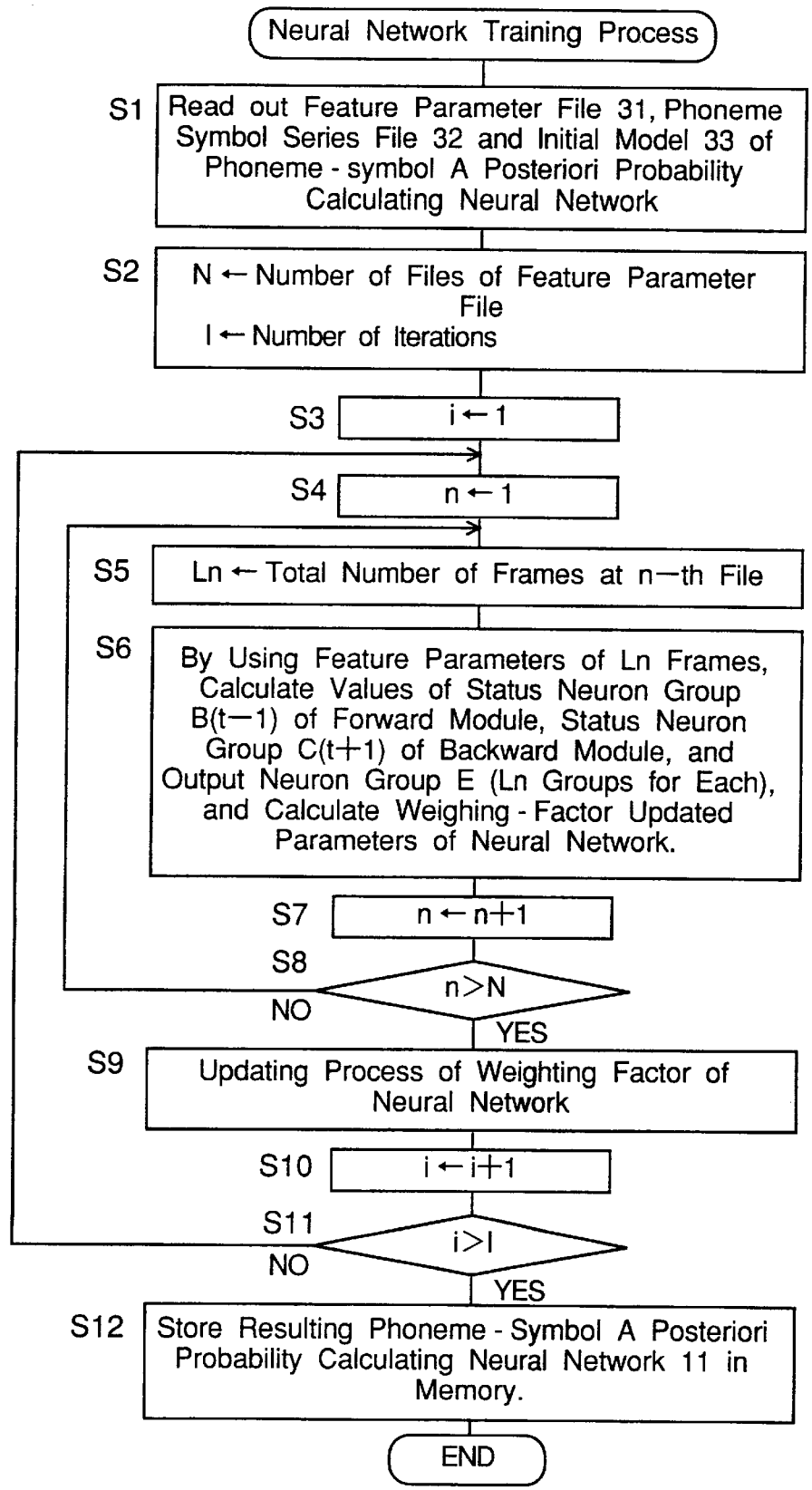
FIG. 4 is a flow chart showing a neural network training process performed by a neural network training section 10 shown in FIG. 1.

FIG. 4 is a flow chart showing a neural network training process executed by the neural network training section 10 shown in FIG. 1.

Referring to FIG. 4, first of all, at step S1, the feature parameter file 31, the phoneme symbol series file 32 corresponding to the feature parameter file and the initial model 33 of the phoneme-symbol a posteriori probability calculating neural network are read in the neural network training section 10. Next, at step S2, the number of files for the feature parameter file 31 corresponding to the total number of utterances of the phoneme symbol series file 32 is set to a parameter N, and the number of iterations for training is set to a parameter I. Then, the parameter i is initialized to one at step S3, and the parameter n is initialized to one at step S4. At step S5, the total number of frames at the n-th file is set to a parameter Ln. Next at step S6, by using feature parameters of Ln frames, the output values of the status neuron group B(t−1) of the forward module, the status neuron group C(t+1) of the backward module and the output neuron group E (Ln groups for each) are calculated, and the weighting-coefficient updated parameters of the neural network are calculated.

Then, after the parameter n is incremented by one at step S7, it is decided at step S8 whether or not n>N. If n≦N, then the program returns to step S5, where the foregoing processes from step S5 to step S7 are iterated. If n>N at step S8, then the weighting coefficient updating process of the neural network is executed at step S9, the parameter i is incremented by one at step S10, and thereafter, it is decided at step S11 whether or not i>N. If i≦I here, then it is judged that a predetermined number of iterations has been reached, followed by step S12, where the resulting phoneme-symbol a posteriori probability calculating neural network 11 is stored in the memory. Thus, the neural network training process is completed. The phoneme-symbol a posteriori probability calculating neural network 11 after the training is connected to the phoneme checking section 4.

Next, the speaker-independent continuous speech recognition apparatus will be described. Referring to FIG. 1, an uttered speech of a speaker is inputted to a microphone 1, and then is converted into a speech signal. The speech signal is inputted to the feature extracting section 2. The feature extracting section 2 converts the input speech signal from analog to digital form, i.e, digital speech signal data, and then executes, for example, LPC analysis to extract 26-dimensional feature parameters including 12-dimensional MFCCs, a log power, and the respective primary recurrent coefficients of the MFCCs and the log power. Then a time series of the extracted feature parameters is inputted to the phoneme checking section 4 via the buffer memory 3.

The phoneme checking section 4 executes a phoneme checking process in response to a phoneme checking request from the phoneme-context dependent LR parser 5. Then, by using the trained phoneme-symbol a posteriori probability calculating neural network 11, the a posteriori probabilities of phoneme symbols for the speech signal data within the phoneme checking interval are calculated and besides the most likely phoneme symbol candidate is detected, where the value of the a posteriori probability of the most likely phoneme symbol at this timing is returned to the LR parser 5 as a phoneme checking score. In this process, a forward path algorithm is used.

On the other hand, a predetermined context-free grammar (CFG) within the context-free grammar database 13 is automatically transformed in a manner known to those skilled in the art so that the LR table 12 is generated and stored in the memory therefor. The LR parser 5 uses a publicly already known LR algorithm (algorithm using left-to-right processing and rightmost derivation processing), and looking up to the LR table 12, processes input phoneme predicted data from left to right without turning back. When there is an ambiguity syntactically therein, analyses for all the candidates are processed in parallel with the stack divided. The LR parser 5 predicts the next-coming phoneme from the LR table 12, outputting phoneme predicted data to the phoneme checking section 4. Responsive to this, the phoneme checking section 4 checks the phoneme-symbol corresponding to the phoneme candidate by looking up to the phoneme-symbol a posteriori probability calculating neural network 11, and returns its likelihood to the LR parser 5 as a speech recognition score, in which way phonemes are strung one after another, so that continuous speech is recognized. In this recognition of continuous speech, when a plurality of phonemes are predicted, all these phonemes are checked for their existence, and such a branch cut that partial trees of high likelihood of partial speech recognition are left is carried out by the beam search method, by which high speed processing is realized.

As described above, according to the phoneme-symbol a posteriori probability calculating neural network 11 obtained by the neural network training section 10 that implements an apparatus for generating a phoneme-symbol a posteriori probability calculating model, the circuit construction is simple and the IC integration is easy to accomplish, as compared with the prior art, so that a posteriori probabilities of phoneme symbols can be determined without any approximation, and that the a posteriori probabilities of phoneme symbols can be calculated with a higher precision and a higher speed than those of the prior art. Also, since speech recognition is done by using the phoneme-symbol a posteriori probability calculating neural network 11, the speech recognition can be accomplished with a higher ratio of speech recognition than that of the prior art.

Further, since the phoneme signals for training or hypothetical phoneme signals are encoded by using the encoders 56, 66 and 71 so as to be inputted to the input neuron groups 51 and 61, A(t), respectively, with lowered numbers of bits, the construction of the neural network 11 can be further extremely simplified.

SECOND PREFERRED EMBODIMENT

FIG. 5 is a block diagram showing a constitution of a a posteriori-probability calculating neural network 11a, which is a second preferred embodiment according to the present invention.

As shown in FIG. 5, the phoneme-symbol a posteriori probability calculating neural network 11a of the second preferred embodiment differs from the phoneme-symbol a posteriori probability calculating neural network 11 of the first preferred embodiment in the constitutions of the forward module B(t−1) and the backward module C(t+1). The differences are explained in detail below.

Referring to FIG. 5, a forward module B(t−1) is a module which has a forward-in-time feedback connection of a delay element 54, and which generates and outputs to a hidden neuron group D, 64 parameters of timing "t−1" delayed by a predetermined unit timing or time from 32 parameters which are outputted from the input neuron group A(t), based on the 26 speech feature parameters and 6 encoded phoneme signals. The forward module B(t−1) comprises:

(a) an input neuron group 51 having 32 units $a_1$ to $a_{32}$ which receive, as input signals, 26 speech feature parameters Abm and 6 encoded phoneme signals Aam;

(b) an intermediate neuron group 52 having 32 units $b_1$ to $b_{32}$ which receive, as input signals, 32 parameters outputted from an intermediate neuron group 53 via a delay element 54;

(c) the intermediate neuron group 53 having 32 units $b_1$ to $b_{32}$ which are connected in such a way that 26 speech feature parameters out of 32 parameters outputted from the input neuron group 51 are multiplied by respective weighting coefficients and respective multiplied values are respectively inputted to respective 32 units $b_1$ to $b_{32}$ of the intermediate neuron group 53;

(d) the delay element 54 for outputting 32 parameters outputted from the intermediate neuron group 53, to the intermediate neuron group 52 with a delay of a predetermined unit timing or time; and (e) an output latch 55 which is a status neuron group of the forward module B(t−1) having 32 units $b_1$ to $b_{32}$ and which temporarily stores or latches the output values outputted from the intermediate neuron group 53 at the timing "t−1" upon completion of the operation of the forward module B(t−1), and outputs them to the hidden neuron group D of a right-side neural network for the calculation of a posteriori probabilities of phoneme symbols.

In this case, the forward module B(t−1) is characterized in that the units $a_1$ through $a_6$ of the input neuron group 51 are not connected to the units $c_1$ through $c_{32}$ of the intermediate neuron group 53.

In the forward module B(t−1) constructed as described above, a feedback loop is formed from the intermediate neuron group 52 via the intermediate neuron group 53 and the delay element 54 to the intermediate neuron group 52.

The output parameter vectors $B_m$ (m=1, 2, . . . , t−1) outputted from the intermediate neuron group 53 at the timing "t−1" upon completion of the operation of the forward module B(t−1) after iterated calculations can be expressed by the following equation:

$$B_m = W_{FA} \cdot A_m + W_{FB} \cdot B_{m-1} \qquad (15).$$

In this case, the output value vectors $B_m$ are comprised of 32 parameter values, and its initial value vector $B_0$ can be expressed by the following equation:

$$B_0 = \begin{bmatrix} 0 \\ 0 \\ \vdots \\ \vdots \\ 0 \end{bmatrix}. \qquad (16)$$

Also, input parameter vectors $A_m$ for the input neuron group 51 are the same as those in the Equation (3) of the first preferred embodiment. Further, the weighting coefficient matrices $W_{FA}$ and $W_{FB}$ in the Equation (11) are a 32×32 matrix and a 32×32 matrix, respectively, and can be expressed by the following equations:

$$W_{FA} = \begin{bmatrix} 0 & \ldots & 0 & W_{FA1,7} & \ldots & W_{FA1,32} \\ \ldots & \ldots & \ldots & \ldots & \ldots & \ldots \\ 0 & \ldots & 0 & W_{FA6,7} & \ldots & W_{FA6,32} \\ 0 & \ldots & 0 & W_{FA7,7} & \ldots & W_{FA7,32} \\ \ldots & \ldots & \ldots & \ldots & \ldots & \ldots \\ 0 & \ldots & 0 & W_{FA32,7} & \ldots & W_{FA32,32} \end{bmatrix} \text{ and} \qquad (17)$$

$$W_{FB} = \begin{bmatrix} W_{FB1,1} & W_{FB1,2} & \ldots & W_{FB1,32} \\ W_{FB2,1} & W_{FB2,2} & \ldots & W_{FB2,32} \\ \ldots & \ldots & \ldots & \ldots \\ \ldots & \ldots & \ldots & \ldots \\ W_{FB32,1} & W_{FB32,2} & \ldots & W_{FB32,32} \end{bmatrix}. \qquad (18)$$

Further, referring to FIG. 5, a backward module C(t+1) is a module which has a backward-in-time feedback connection of an inverse delay element 64, and which generates and outputs to the hidden neuron group D, 64 parameters of timing "t+1" inversely delayed by a predetermined unit timing or time from 64 parameters which are outputted from the input neuron group A(t), based on the 26 speech feature parameters and 6 encoded phoneme signals. The backward module C(t+1) comprises:

(a) an input neuron group 61 having 32 units $a_1$ to $a_{32}$ which receive, as input signals, 26 speech feature parameters Abm and 6 encoded phoneme signals Aam;

(b) an intermediate neuron group 62 having 64 units $c_1$ to $c_{64}$ which receive, as input signals, 64 parameters that are outputted from an intermediate neuron group 63 via the inverse delay element 64;

(c) the intermediate neuron group 63 having 64 units $c_1$ to $c_{64}$ which are connected in such a way that 32 parameters including 26 speech feature parameters Abm outputted from the input neuron group 61 and 6 encoded phoneme signals are multiplied by respective weighting coefficients and the respective multiplied values are respectively inputted to the respective 64 units $c_1$ to $c_{64}$ of the intermediate neuron group 63;

(d) the inverse delay element 64 for outputting 64 parameters outputted from the intermediate neuron group 63, to the intermediate neuron group 62 with a delay of a predetermined unit timing or time; and (e) an output latch 65 which is a status neuron group of the backward module C(t+1) having 64 units $c_1$ to $c_{64}$ and which temporarily stores or latches the output values outputted from the intermediate neuron group 63 at the timing "t+1" upon completion of the operation of the backward module C(t+1), and outputs them to the hidden neuron group D of the right-side neural network for the calculation of a posteriori probabilities of phoneme symbols.

In the backward module C(t+1) constructed as described above, a feedback loop is formed from the intermediate neuron group 62 via the intermediate neuron group 63 and the inverse delay element 64 to the intermediate neuron group 62. The output parameter vectors $C_m$ (m=L, L−1, . . . , t+1) outputted from the intermediate neuron group 63 at the timing "t+1" upon completion of the operation of the backward module C(t+1) after iterated calculations can be expressed by the following equation:

$$C_m = W_{BA} \cdot A_m + W_{BC} \cdot C_{m+1} \qquad (19).$$

In this case, the output value vector $C_m$ are comprised of 64 parameter values, and its initial value vector $C_{L+1}$ can be expressed by the following equation:

$$C_{L+1} = \begin{bmatrix} 0 \\ 0 \\ \vdots \\ \vdots \\ 0 \end{bmatrix}. \qquad (20)$$

Also, input parameter vectors $A_m$ for the input neuron group 61 are the same as those in the Equation (3). Further, weighting coefficient matrices $W_{BA}$ and $W_{BC}$ in the Equation (6) are a 64×32 matrix and a 64×64 matrix, respectively, and can be expressed by the following equations:

$$W_{BA} = \begin{bmatrix} W_{BA1,1} & W_{BA1,2} & \ldots & W_{BA1,32} \\ W_{BA2,1} & W_{BA2,2} & \ldots & W_{BA2,32} \\ \ldots & \ldots & \ldots & \ldots \\ \ldots & \ldots & \ldots & \ldots \\ W_{BA64,1} & W_{BA64,2} & \ldots & W_{BA64,32} \end{bmatrix} \text{ and} \qquad (21)$$

$$W_{FB} = \begin{bmatrix} W_{FB1,1} & W_{FB1,2} & \ldots & W_{FB1,64} \\ W_{FB2,1} & W_{FB2,2} & \ldots & W_{FB2,64} \\ \ldots & \ldots & \ldots & \ldots \\ \ldots & \ldots & \ldots & \ldots \\ W_{FB64,1} & W_{FB64,2} & \ldots & W_{FB64,64} \end{bmatrix}. \qquad (22)$$

As shown in FIG. 5, the a posteriori-probability calculating neural network 11a further comprises a hidden neuron group D having 64 hidden units $d_1$ to $d_{64}$, and an output neuron group E which have 61 output units $e_1$ to $e_{61}$ and which outputs a posteriori probabilities $P_i$ (i=1, 2, . . . , 61) of 61 phoneme signals, in a manner similar to that of the first preferred embodiment.

In this case, for the processing ranging from the status neuron groups B(t−1) and C(t+1) as well as the input neuron group A(t) to the hidden neuron group D up to the output neuron group E, the training or calculating process is executed after the completion of the processing operation of the forward module B(t−1) and the backward module C(t+1).

In this neural network 11a, an input layer 100 comprises the input neuron group A(t), the forward module B(t−1) for calculating output parameters at timing "t−1" delayed by a unit timing from the output timing "t" of the input neuron group A(t), and the backward module C(t+1) for calculating output parameters at timing "t+1" inversely delayed by a unit timing or time from the timing "t". An intermediate layer 200 comprises the hidden neuron group D, and an output layer 300 comprises the output neuron group E.

The phoneme-symbol a posteriori probability calculating neural network 11a constructed as described above is equivalently shown in FIG. 6, and is a BRNN, in which the forward module of the units of the forward status neutron group B and the backward module of the units of the backward status neutron group C are connected in the direction of time or timing, respectively, and the input layer 100 comprises the input neuron group A(t), the forward module B(t−1) and the backward module C(t+1).

The phoneme-symbol a posteriori probability calculating neural network constructed as described above is trained to be created by the neural network training section 10 shown in FIG. 1, in a manner similar to that of the first preferred embodiment. The created phoneme-symbol a posteriori probability calculating neural network 11 is used by the speech recognition apparatus shown in FIG. 1.

As described above, according to the phoneme-symbol a posteriori probability calculating neural network 11a obtained by the neural network training section 10 that implements an apparatus for generating a phoneme-symbol a posteriori probability calculating model, the circuit construction is simple and the IC integration is easy to accomplish, as compared with the prior art, so that a posteriori probabilities of phoneme symbol series can be determined without any approximation, and that the a posteriori probabilities of phoneme symbol series can be calculated with a higher precision and a higher speed than those of the prior art. Also, since speech recognition is done by using the phoneme-symbol a posteriori probability calculating neural network 11a, the speech recognition can be accomplished with a higher ratio of speech recognition than that of the prior art.

In the foregoing embodiments, the preferred embodiments have been described, and the number of the units of each group of the neural network is not limited to those in the preferred embodiments, being required only to have a plurality of units. In addition, the hidden neuron group D of the intermediate layer 200 preferably has a number of units larger than the number of units of the output neuron group E of the output layer 300.

In the first preferred embodiment, the units $a_1$ to $a_6$ of the input neuron group 61, which are not connected to the intermediate neuron group 63, may be omitted.

In the second preferred embodiment, the units $a_1$ to $a_6$ of the input neuron group 51, which are not connected to the intermediate neuron group 53, may be omitted.

SIMULATION

The present inventor conducted a classification test of phonemes with speech feature parameters and their hypothetical phonemes taken as input signals, by using a phoneme database possessed by the present patent applicant. As a result, phonemes were able to be detected with a ratio of correct answers of 77.5% with respect to a data set containing all the 61 kinds of phoneme symbols. Thus, it could be considered that when the phoneme-symbol a posteriori probability calculating neural network 11 of the preferred embodiment is applied, the speech recognition can be accomplished with a higher ratio of speech recognition than that in the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for calculating a posteriori probabilities of phoneme symbols, comprising:

feature extracting means for extracting speech feature parameters from a speech signal of an uttered speech sentence composed of an inputted character series; and calculating means for calculating a a posteriori probability of a phoneme symbol of the speech signal, by using a bidirectional recurrent neural network, wherein said bidirectional recurrent neural network comprises:

an input layer for receiving, as input signals, the speech feature parameters extracted by the feature extracting means and a plurality of hypothetical phoneme symbol series signals;

an intermediate layer of at least one layer having a plurality of units; and an output layer for outputting a a posteriori probability of each phoneme symbol, wherein said input layer comprises:

a first input neuron group having a plurality of units, for receiving, as input signals, a plurality of speech feature parameters and a plurality of phoneme symbol series signals;

a forward module; and a backward module, wherein said forward module has a forward-in-time feedback connection, and generates and outputs to said intermediate layer, a plurality of parameters of a timing delayed by a predetermined unit time from a plurality of parameters outputted from said first input neuron group, based on a plurality of speech feature parameters and a plurality of phoneme symbol series signals, and wherein said backward module has a backward-in-time feedback connection, and generates and outputs to said intermediate layer, a plurality of parameters of a timing inversely delayed by a predetermined unit timing from a plurality of parameters outputted from said first input neuron group, based on a plurality of speech feature parameters.

2. The apparatus as claimed in claim 1, wherein said forward module comprises:

a second input neuron group having a plurality of units, for receiving, as input signals, a plurality of speech feature parameters and a plurality of phoneme symbol series signals;

a first intermediate neuron group having a plurality of units, for receiving, as input signals, a plurality of parameters outputted from a second intermediate neuron group with a delay of a predetermined unit timing; and said second intermediate neuron group having a plurality of units, which is connected to said second input neuron group and said first intermediate neuron group so that a plurality of parameters outputted from said second input neuron group and a plurality of parameters outputted from said first intermediate neuron group are multiplied by respective weighting coefficients and respective multiplied values are respectively inputted to the plurality of units of said second intermediate neutron group, wherein said backward module comprises:

a third input neuron group having a plurality of units, for receiving, as input signals, a plurality of speech feature parameters;

a third intermediate neuron group having a plurality of units, for receiving, as input signals, a plurality of parameters outputted from a fourth intermediate neuron group with an inverse delay of a predetermined unit timing; and said fourth intermediate neuron group having a plurality of units, which is connected to said third input neuron group and said third intermediate neuron group so that a plurality of parameters outputted from said third input neuron group and a plurality of parameters outputted from said third intermediate neuron group are multiplied by respective weighting coefficients and respective multiplied values are respectively inputted to the plurality of units of said fourth intermediate neutron group, wherein said second intermediate neuron group is connected to the plurality of units of said intermediate layer so that a plurality of parameters outputted from said second intermediate neuron group are multiplied by respective weighting coefficients and respective multiplied values are respectively inputted to the plurality of units of said intermediate layer, wherein said first input neuron group is connected to the plurality of units of said intermediate layer so that a plurality of parameters outputted from said first input neuron group are multiplied by respective weighting coefficients and respective multiplied values are respectively inputted to the plurality of units of said intermediate layer, wherein said fourth intermediate neuron group is connected to the plurality of units of said intermediate layer so that a plurality of parameters outputted from said fourth intermediate neuron group are multiplied by respective weighting coefficients and respective multiplied values are respectively inputted to the plurality of units of said intermediate layer, and wherein said intermediate layer is connected to the plurality of units of said output layer so that a plurality of parameters outputted from said intermediate layer are multiplied by respective weighting coefficients and respective multiplied values are respectively inputted to the plurality of units of said output layer.

3. The apparatus as claimed in claim 1, further comprising:

encoding means for encoding the plurality of phoneme symbol series signals and outputting the encoded signals to said first, second and third input neuron groups.

4. The apparatus as claimed in claim 2, further comprising:

encoding means for encoding the plurality of phoneme symbol series signals and outputting the encoded signals to said first, second and third input neuron groups.

5. An apparatus for calculating a posteriori probabilities of phoneme symbols, comprising:

feature extracting means for extracting speech feature parameters from a speech signal of an uttered speech sentence composed of an inputted character series; and calculating means for calculating a a posteriori probability of a phoneme symbol of the speech signal, by using a bidirectional recurrent neural network, wherein said bidirectional recurrent neural network comprises:

an input layer for receiving, as input signals, the speech feature parameters extracted by the feature extracting means and a plurality of hypothetical phoneme symbol series signals;

an intermediate layer of at least one layer, having a plurality of units; and an output layer for outputting a a posteriori probability of each phoneme symbol, wherein said input layer comprises:

a first input neuron group having a plurality of units, for receiving, as input signals, a plurality of speech feature parameters and a plurality of phoneme symbol series signals;

a forward module; and a backward module, wherein the forward module has a forward-in-time feedback connection, and generates and outputs to said intermediate layer, a plurality of parameters of a timing delayed by a predetermined unit timing from a plurality of parameters outputted from said first input neuron group, based on a plurality of speech feature parameters, and wherein said backward module has a backward-in-time feedback connection, and generates and outputs to said intermediate layer, a plurality of parameters of a timing inversely delayed by a predetermined unit timing from a plurality of parameters outputted from said first input neuron group, based on a plurality of speech feature parameters and a plurality of phoneme symbol series signals.

6. The apparatus as claimed in claim 5, wherein said forward module comprises:

a second input neuron group having a plurality of units, for receiving, as input signals, a plurality of speech feature parameters;

a first intermediate neuron group having a plurality of units, for receiving, as input signals, a plurality of parameters outputted from a second intermediate neuron group with a delay of a predetermined unit timing; and said second intermediate neuron group having a plurality of units, which is connected to said second input neuron group and said first intermediate neuron group so that a plurality of parameters outputted from said second input neuron group and a plurality of parameters outputted from said first intermediate neuron group are multiplied by respective weighting coefficients and respective multiplied values are respectively inputted to the plurality of units of said second intermediate neutron group, wherein said backward module comprises:
a third input neuron group having a plurality of units, for receiving, as input signals, a plurality of speech feature parameters and a plurality of phoneme symbol series signals;
a third intermediate neuron group having a plurality of units, for receiving, as input signals, a plurality of parameters outputted from a fourth intermediate neuron group with an inverse delay of a predetermined unit timing; and
said fourth intermediate neuron group having a plurality of units, which is connected to said third input neuron group and said third intermediate neuron group so that a plurality of parameters outputted from said third input neuron group and a plurality of parameters outputted from said third intermediate neuron group are multiplied by respective weighting coefficients and respective multiplied values are respectively inputted to the plurality of units of said fourth intermediate neuron group,
wherein said second intermediate neuron group are connected to the plurality of units of said intermediate layer so that a plurality of parameters outputted from said second intermediate neuron group are multiplied by respective weighting coefficients and respective multiplied values are respectively inputted to the plurality of units of said intermediate layer,
wherein said first input neuron group are connected to the plurality of units of said intermediate layer so that a plurality of parameters outputted from said first input neuron group are multiplied by respective weighting coefficients and respective multiplied values are respectively inputted to the plurality of units of said intermediate layer,
wherein said fourth intermediate neuron group are connected to the plurality of units of said intermediate layer so that a plurality of parameters outputted from said fourth intermediate neuron group are multiplied by respective weighting coefficients and respective multiplied values are respectively inputted to the plurality of units of said intermediate layer, and
wherein said intermediate layer are connected to the plurality of units of said output layer so that a plurality of parameters outputted from said intermediate layer are multiplied by respective weighting coefficients and respective multiplied values are respectively inputted to the plurality of units of said output layer.

7. The apparatus as claimed in claim 5, further comprising:
encoding means for encoding the plurality of phoneme symbol series signals and outputting the encoded signals to said first, second and third input neuron groups.

8. The apparatus as claimed in claim 6, further comprising:
encoding means for encoding the plurality of phoneme symbol series signals and outputting the encoded signals to said first, second and third input neuron groups.

9. A speech recognition apparatus comprising:
feature extracting means for extracting speech feature parameters from a speech signal of an uttered speech sentence composed of an inputted character series;
calculating means for calculating a a posteriori probability of a phoneme symbol of the speech signal, by using a bidirectional recurrent neural network; and
speech recognition means for selecting, as a detected phoneme, a phoneme symbol having the greatest a posteriori probability out of phoneme symbols having a posteriori probabilities calculated by said calculating means, based on the feature parameters extracted by the feature extracting means, thereby performing speech recognition on the speech signal,
wherein said bidirectional recurrent neural network comprises:
an input layer for receiving, as input signals, the speech feature parameters extracted by the feature extracting means and a plurality of hypothetical phoneme symbol series signals;
an intermediate layer of at least one layer having a plurality of units; and
an output layer for outputting a a posteriori probability of each phoneme symbol,
wherein said input layer comprises:
a first input neuron group having a plurality of units, for receiving, as input signals, a plurality of speech feature parameters and a plurality of phoneme symbol series signals;
a forward module; and
a backward module,
wherein said forward module has a forward-in-time feedback connection, and generates and outputs to said intermediate layer, a plurality of parameters of a timing delayed by a predetermined unit time from a plurality of parameters outputted from said first input neuron group, based on a plurality of speech feature parameters and a plurality of phoneme symbol series signals, and
wherein said backward module has a backward-in-time feedback connection, and generates and outputs to said intermediate layer, a plurality of parameters of a timing inversely delayed by a predetermined unit timing from a plurality of parameters outputted from said first input neuron group, based on a plurality of speech feature parameters.

10. The apparatus as claimed in claim 9,
wherein said forward module comprises:
a second input neuron group having a plurality of units, for receiving, as input signals, a plurality of speech feature parameters and a plurality of phoneme symbol series signals;
a first intermediate neuron group having a plurality of units, for receiving, as input signals, a plurality of parameters outputted from a second intermediate neuron group with a delay of a predetermined unit timing; and
said second intermediate neuron group having a plurality of units, which is connected to said second input neuron group and said first intermediate neuron group so that a plurality of parameters outputted from said second input neuron group and a plurality of parameters outputted from said first intermediate neuron group are multiplied by respective weighting coefficients and respective multiplied values are respectively inputted to the plurality of units of said second intermediate neutron group,
wherein said backward module comprises:
a third input neuron group having a plurality of units, for receiving, as input signals, a plurality of speech feature parameters;
a third intermediate neuron group having a plurality of units, for receiving, as input signals, a plurality of parameters outputted from a fourth intermediate neuron group with an inverse delay of a predetermined unit timing; and said fourth intermediate neuron group having a plurality of units, which is connected to said third input neuron group and said third intermediate neuron group so that a plurality of parameters outputted from said third input neuron group and a plurality of parameters outputted from said third intermediate neuron group are multiplied by respective weighting coefficients and respective multiplied values are respectively inputted to the plurality of units of said fourth intermediate neutron group, wherein said second intermediate neuron group is connected to the plurality of units of said intermediate layer so that a plurality of parameters outputted from said second intermediate neuron group are multiplied by respective weighting coefficients and respective multiplied values are respectively inputted to the plurality of units of said intermediate layer, wherein said first input neuron group is connected to the plurality of units of said intermediate layer so that a plurality of parameters outputted from said first input neuron group are multiplied by respective weighting coefficients and respective multiplied values are respectively inputted to the plurality of units of said intermediate layer, wherein said fourth intermediate neuron group is connected to the plurality of units of said intermediate layer so that a plurality of parameters outputted from said fourth intermediate neuron group are multiplied by respective weighting coefficients and respective multiplied values are respectively inputted to the plurality of units of said intermediate layer, and wherein said intermediate layer is connected to the plurality of units of said output layer so that a plurality of parameters outputted from said intermediate layer are multiplied by respective weighting coefficients and respective multiplied values are respectively inputted to the plurality of units of said output layer.

11. A speech recognition apparatus comprising:

feature extracting means for extracting speech feature parameters from a speech signal of an uttered speech sentence composed of an inputted character series;

calculating means for calculating a a posteriori probability of a phoneme symbol of the speech signal, by using a bidirectional recurrent neural network; and speech recognition means for selecting, as a detected phoneme, a phoneme symbol having the greatest a posteriori probability out of phoneme symbols having a posteriori probabilities calculated by said calculating means, based on the feature parameters extracted by the feature extracting means, thereby performing speech recognition on the speech signal, wherein said bidirectional recurrent neural network comprises:

an input layer for receiving, as input signals, the speech feature parameters extracted by the feature extracting means and a plurality of hypothetical phoneme symbol series signals;

an intermediate layer of at least one layer, having a plurality of units; and an output layer for outputting a a posteriori probability of each phoneme symbol, wherein said input layer comprises:

a first input neuron group having a plurality of units, for receiving, as input signals, a plurality of speech feature parameters and a plurality of phoneme symbol series signals;

a forward module; and a backward module, wherein the forward module has a forward-in-time feedback connection, and generates and outputs to said intermediate layer, a plurality of parameters of a timing delayed by a predetermined unit timing from a plurality of parameters outputted from said first input neuron group, based on a plurality of speech feature parameters, and wherein said backward module has a backward-in-time time feedback connection, and generates and outputs to said intermediate layer, a plurality of parameters of a timing inversely delayed by a predetermined unit timing from a plurality of parameters outputted from said first input neuron group, based on a plurality of speech feature parameters and a plurality of phoneme symbol series signals.

12. The apparatus as claimed in claim 11, wherein said forward module comprises:

a second input neuron group having a plurality of units, for receiving, as input signals, a plurality of speech feature parameters;

a first intermediate neuron group having a plurality of units, for receiving, as input signals, a plurality of parameters outputted from a second intermediate neuron group with a delay of a predetermined unit timing; and said second intermediate neuron group having a plurality of units, which is connected to said second input neuron group and said first intermediate neuron group so that a plurality of parameters outputted from said second input neuron group and a plurality of parameters outputted from said first intermediate neuron group are multiplied by respective weighting coefficients and respective multiplied values are respectively inputted to the plurality of units of said second intermediate neutron group, wherein said backward module comprises:

a third input neuron group having a plurality of units, for receiving, as input signals, a plurality of speech feature parameters and a plurality of phoneme symbol series signals;

a third intermediate neuron group having a plurality of units, for receiving, as input signals, a plurality of parameters outputted from a fourth intermediate neuron group with an inverse delay of a predetermined unit timing; and said fourth intermediate neuron group having a plurality of units, which is connected to said third input neuron group and said third intermediate neuron group so that a plurality of parameters outputted from said third input neuron group and a plurality of parameters outputted from said third intermediate neuron group are multiplied by respective weighting coefficients and respective multiplied values are respectively inputted to the plurality of units of said fourth intermediate neutron group, wherein said second intermediate neuron group are connected to the plurality of units of said intermediate layer so that a plurality of parameters outputted from said second intermediate neuron group are multiplied by respective weighting coefficients and respective multiplied values are respectively inputted to the plurality of units of said intermediate layer, wherein said first input neuron group are connected to the plurality of units of said intermediate layer so that a plurality of parameters outputted from said first input neuron group are multiplied by respective weighting coefficients and respective multiplied values are respectively inputted to the plurality of units of said intermediate layer, wherein said fourth intermediate neuron group are connected to the plurality of units of said intermediate layer so that a plurality of parameters outputted from said fourth intermediate neuron group are multiplied by respective weighting coefficients and respective multiplied values are respectively inputted to the plurality of units of said intermediate layer, and wherein said intermediate layer are connected to the plurality of units of said output layer so that a plurality of parameters outputted from said intermediate layer are multiplied by respective weighting coefficients and respective multiplied values are respectively inputted to the plurality of units of said output layer.

13. The apparatus as claimed in claim 9, further comprising:
    encoding means for encoding the plurality of phoneme symbol series signals and outputting the encoded signals to said first, second and third input neuron groups.

14. The apparatus as claimed in claim 10, further comprising:
    encoding means for encoding the plurality of phoneme symbol series signals and outputting the encoded signals to said first, second and third input neuron groups.

15. The apparatus as claimed in claim 11, further comprising:
    encoding means for encoding the plurality of phoneme symbol series signals and outputting the encoded signals to said first, second and third input neuron groups.

16. The apparatus as claimed in claim 12, further comprising:
    encoding means for encoding the plurality of phoneme symbol series signals and outputting the encoded signals to said first, second and third input neuron groups.

* * * * *